United States Patent [19]
Oka et al.

[11] Patent Number: 5,854,355
[45] Date of Patent: Dec. 29, 1998

[54] CONTINUOUS PROCESS FOR PREPARATION OF HIGHLY RIGID PROPYLENE-ETHYLENE BLOCK COPOLYMERS

[75] Inventors: Takahiro Oka; Shunji Kawazoe; Yasuhiro Yamane, all of Chiba, Japan

[73] Assignee: Chisso Corporation, Osaka, Japan

[21] Appl. No.: 929,052

[22] Filed: Sep. 15, 1997

Related U.S. Application Data

[63] Continuation of Ser. No. 623,077, Mar. 28, 1996, abandoned.

[30] Foreign Application Priority Data

Apr. 24, 1995 [JP] Japan .................................. 7-123065

[51] Int. Cl.⁶ .................................................. C08F 29/08
[52] U.S. Cl. ............................ 525/323; 525/247; 525/53
[58] Field of Search ................................ 525/53, 323, 247

[56] References Cited

FOREIGN PATENT DOCUMENTS

| | | |
|---|---|---|
| 47-8207 | 3/1972 | Japan . |
| 49-13231 | 3/1974 | Japan . |
| 49-13514 | 4/1974 | Japan . |
| 50-108385 | 8/1975 | Japan . |
| 50-115296 | 9/1975 | Japan . |
| 50-126590 | 10/1975 | Japan . |
| 51-20297 | 2/1976 | Japan . |
| 51-28189 | 3/1976 | Japan . |
| 51-64586 | 6/1976 | Japan . |
| 51-92885 | 8/1976 | Japan . |
| 51-136625 | 11/1976 | Japan . |
| 52-4588 | 1/1977 | Japan . |
| 52-87489 | 7/1977 | Japan . |
| 52-100596 | 8/1977 | Japan . |
| 52-104593 | 9/1977 | Japan . |
| 52-147688 | 12/1977 | Japan . |
| 53-2580 | 1/1978 | Japan . |
| 53-29390 | 3/1978 | Japan . |
| 53-35879 | 4/1978 | Japan . |
| 53-40093 | 4/1978 | Japan . |
| 53-40094 | 4/1978 | Japan . |
| 54-152095 | 11/1979 | Japan . |
| 55-764 | 1/1980 | Japan . |
| 55-8011 | 3/1980 | Japan . |
| 55-115417 | 9/1980 | Japan . |
| 55-116716 | 9/1980 | Japan . |
| 55-135102 | 10/1980 | Japan . |
| 55-135103 | 10/1980 | Japan . |
| 55-152710 | 11/1980 | Japan . |
| 56-811 | 1/1981 | Japan . |
| 56-11908 | 2/1981 | Japan . |
| 56-18606 | 2/1981 | Japan . |
| 57-145115 | 9/1982 | Japan . |
| 57-147508 | 9/1982 | Japan . |
| 57-174311 | 10/1982 | Japan . |
| 57-195718 | 12/1982 | Japan . |
| 58-29811 | 2/1983 | Japan . |
| 58-32615 | 2/1983 | Japan . |
| 58-49716 | 3/1983 | Japan . |
| 58-69215 | 4/1983 | Japan . |
| 58-83006 | 5/1983 | Japan . |
| 58-138705 | 8/1983 | Japan . |
| 58-138706 | 8/1983 | Japan . |
| 58-138707 | 8/1983 | Japan . |
| 58-138708 | 8/1983 | Japan . |
| 58-138709 | 8/1983 | Japan . |
| 58-138710 | 8/1983 | Japan . |
| 58-138715 | 8/1983 | Japan . |
| 58-201816 | 11/1983 | Japan . |
| 60-23404 | 2/1985 | Japan . |
| 61-21109 | 1/1986 | Japan . |
| 61-37802 | 2/1986 | Japan . |
| 61-37803 | 2/1986 | Japan . |
| 62-104810 | 5/1987 | Japan . |
| 62-104811 | 5/1987 | Japan . |
| 62-104812 | 5/1987 | Japan . |
| 62-104813 | 5/1987 | Japan . |
| 62-116618 | 5/1987 | Japan . |
| 63-54405 | 3/1988 | Japan . |

*Primary Examiner*—Irina S. Zemel
*Attorney, Agent, or Firm*—McDermott, Will & Emery

[57] ABSTRACT

A continuous process for preparation of propylene-ethylene block copolymer suitable for moldings with high rigidity and high impact resistance are provided, which process is a continuous process for preparation of highly rigid propylene-ethylene block copolymers, wherein propylene and ethylene are polymerized in the specified 2 steps with use of a catalyst system comprising (A) a solid catalyst component containing Ti, Mg, halogen and polyvalent carboxylic ester, (B) an organic aluminium compound, as well as (C) an organic silicon compound expressed by the general formula $R^4_x R^5_y Si(OR^6)_z$ (wherein, x+y+z=4), and wherein the ratio between the maximum value and the minimum value of MFR(l)) is $$0.1 \leq \mathrm{Log}(\mathrm{MFR(h)/MFR(l)}) \leq 1,$$

and the ratio between the average MFR(i) and MFR(ii) in the subsequent polymerization procedure (II) containing ethylene in a relatively large amount which is carried out by adding the glycol type compound is $$3 \leq \mathrm{Log}(\mathrm{MFR(i)/MFR(ii)}) \leq 7.$$

The product having less fish eye and high impact resistant value was obtained from the copolymer according to the invention.

11 Claims, 2 Drawing Sheets

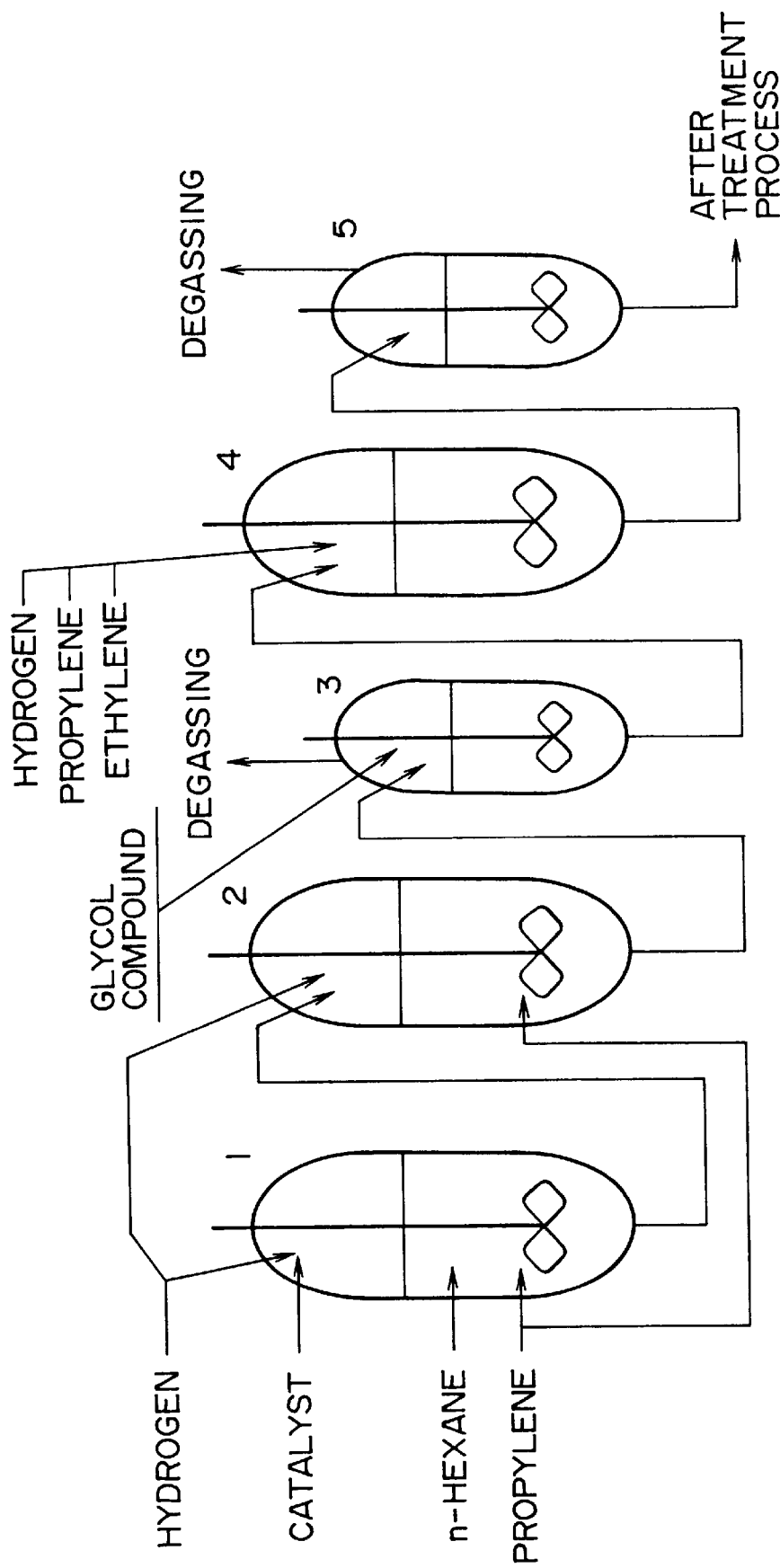

CONTINUOUS PROCESS FOR PREPARATION OF HIGHLY RIGID PROPYLENE-ETHYLENE BLOCK COPOLYMERS

This application is a continuation of application Ser. No. 08/623,077 filed Mar. 28, 1996 now abandoned.

BACKGROUND OF THE INVENTION

1. Field of the Invention

This invention relates to a continuous process for preparation of highly rigid molding propylene-ethylene block copolymers. In more detail, the invention relates to a continuous process for preparation of the said copolymers which can be formed into moldings having a high rigidity and a high impact resistance without adding any special additive.

2. Related Background Art

Crystalline polypropylene as a multi-purpose resin (hereinafter sometimes referred to polypropylene) has high rigidity, hardness, tensile strength and thermal resistance etc. However, it has problems that impact resistance thereof is insufficient and that it can difficultly be used for moldings to be subjected to mechanical impact or to be used at a low temperature. Furthermore, when being compared to other multi-purpose resins such as ABS resin or high impact polystyrene resin, not only impact resistance but also rigidity is inferior.

For enlargement in concrete uses and thus demand of polypropylene, there is required still more improvement not only in the above-mentioned impact resistance but also in rigidity. Crystalline polypropylene prepared by using a catalyst with stereoregularity has superior properties in rigidity and thermal resistance etc., but it has such a problem that impact resistance, particularly low-temperature impact resistance, is low, which restricts its practical use range.

Thus, as a process to solve the problem, there was known a process to copolymerize propylene with other α-olefins such as ethylene at random or as block. The obtained random copolymer is insufficient in improvement of low-temperature impact resistance compared to polypropylene, and also rigidity, strength and thermal resistance etc. are radically lowered with increase of ethylene content. Similarly, concerning the block copolymer, low-temperature impact resistance is improved remarkably compared to polypropylene, but rigidity, strength and thermal resistance etc. are lowered. There have been proposed many processes for improving the above-mentioned disadvantages of the block copolymer.

For example, processes for carrying out block copolymerization of propylene and ethylene in multi-steps are proposed in Toku Kai Sho 50-115296, 52-4588 and 53-35879. Also, an improved process for adding the third component in a catalyst was proposed in Toku Ko Sho 47-8207, 49-13231 and 49-13514. Furthermore, an improved process for using a specified catalyst was proposed in Toku Kai Sho 55-764, 54-152095 and 53-29390 as well as Toku Ko Sho 55-8011.

However, the above-mentioned proposals are alleviating techniques for decreasing the extent of rigidity deterioration of the obtained block copolymer as little as possible compared to polypropylene (homopolymer), so that the rigidity value equal to or more than the said homopolymer cannot be yet obtained. Additionally, a process for preparation of highly rigid propylene-ethylene block copolymer having equal to or more than the said homopolymer was proposed in Toku Kai Sho 58-201816, but improvement in impact resistance was insufficient.

Furthermore, a process for block copolymerization of propylene-ethylene can improve low-temperature impact resistance much without impairing superior characteristics of polypropylene, rigidity and thermal resistance etc., but there may be occurred other problems of production and quality inherent to propylene-ethylene block copolymer. That is, in the case that the propylene-ethylene block copolymer being prepared by a batch polymerization process, yield of the polymer obtained per an unit polymerization vessel per an unit time becomes low and also cost becomes high compared to a continuous polymerization process.

On one hand, in a multistep continuous polymerization process, since distribution (considered to be nearly perfect mixing tank distribution) in resident times of each catalyst particle in polymerization vessel in each step is produced, assemblies of polymer having distributions in content ratio between polypropylene part (PP part; part containing much propylene) and propylene-ethylene random copolymer part (RC part; part containing much ethylene) are obtained, which causes disadvantages in production and quality due to nonuniform distributions. Therefore, many proposals for improving such disadvantages of the continuous polymerization processes.

For example, there were proposed processes for fractionating the slurry left from the above-mentioned polymerization procedure (I) by means of a cyclone and returning fine particles again to the polymerization procedure (I) in Toku Kai Sho 58-49716, 55-116716 and 58-69215 etc., but improvement in nonuniformity is insufficient because fractionation by particle size of the catalyst is not always coincided with the resident time distribution.

There were described processes for carrying out feed of catalyst and removal of slurry from polymerization vessel intermittently to decrease the amount of catalyst introduced in the above-mentioned procedure (II) with a short resident time in Toku Kai Sho 57-195718 and 58-29811 etc., but those processes have problems, that is, polymerization reaction becomes unstable.

Furthermore, there were proposed some processes for inactivating selectively the catalyst left with a short resident period (short cut pass catalyst) by treating slurry left from the polymerization procedure (I) with an electron donating compound etc. similarly to the process of this invention.

By using the electron donating compounds proposed in for example Toku Kai Sho 58-32615, 57-174311, 57-147508, 57-145115 and 55-115417 etc., effects were insufficient to carry out continuous processes for preparation of propylene-ethylene block copolymer having properties corresponding to those of batch polymerization processes.

Also, in the process proposed in Toku Kai Sho 62-116618, polymer having properties corresponding to those of batch polymerization processes can be obtained, but there was a problem not to increase the polymerization yield in the polymerization procedure (II) because of much decrease of catalyst activity in the polymerization procedure (II).

SUMMARY OF THE INVENTION

By studying zealously in view of the existing state of the above-mentioned known techniques in order to invent a continuous process for preparation of propylene-ethylene block copolymer from which highly rigid and highly impact resistant moldings can be obtained without adding any special additive, it is found that the said copolymer can be obtained by preparing continuously under the limited conditions described below, to make this invention.

As is evident from the above-mentioned explanation, an object of the invention is to propose a process for preparing propylene-ethylene block copolymer suitable for moldings with high rigidity and high impact resistance in good productivity.

BRIEF DESCRIPTION OF THE DRAWINGS

FIG. 2 It is an illustration drawing of the polymerization procedures of the process according to the invention.

DETAILED DESCRIPTION OF THE PREFERRED EMBODIMENTS

Figure 1:
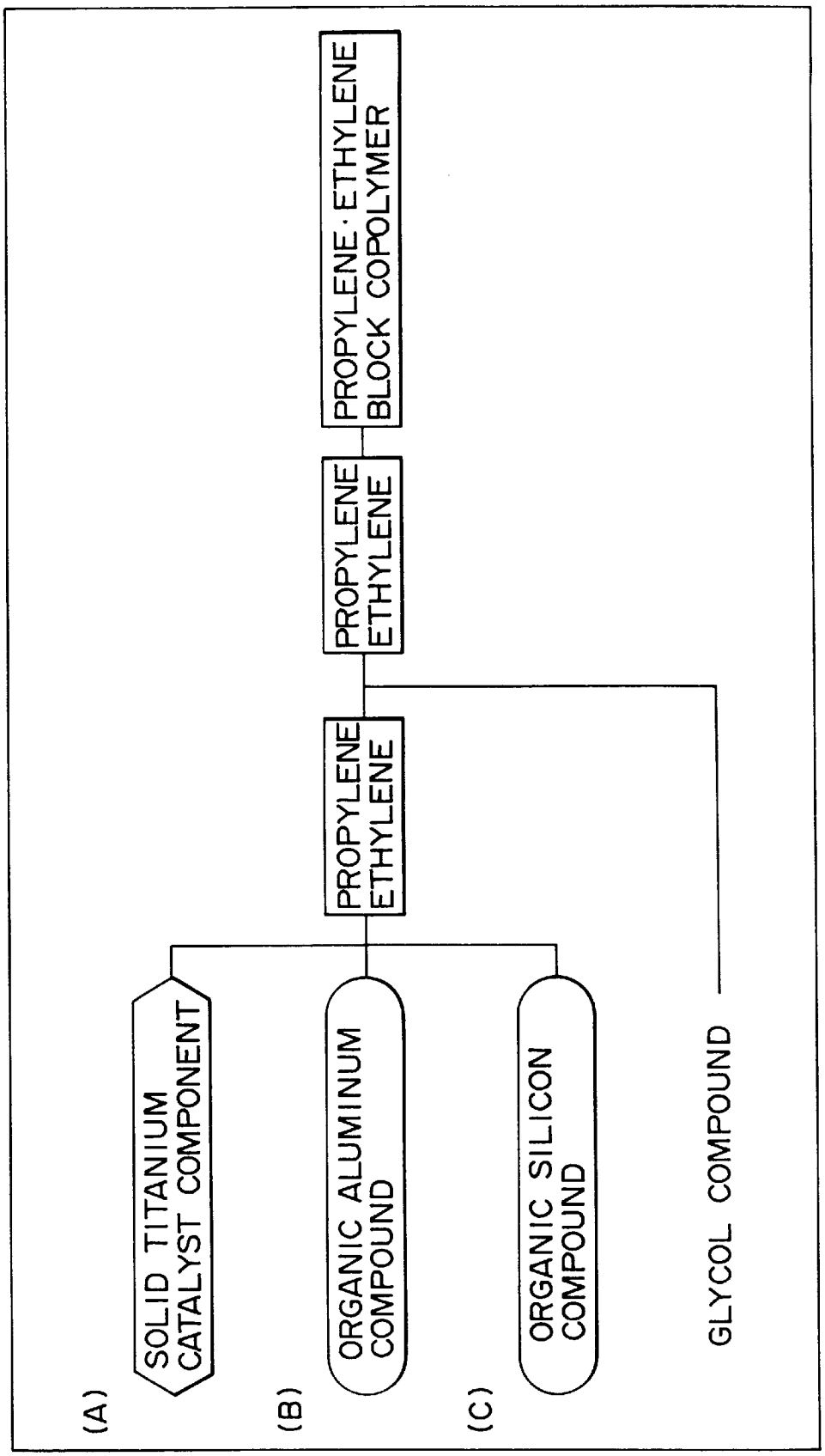
FIG. 1 It is a flow sheet showing the preparation procedures of the process according to the invention.

This invention is consisted of the following (1) and (2).

(1) A continuous process for preparation of highly rigid propylene-ethylene block copolymers characterized in copolymer, characterized in that as the first step a polymerization procedure (I) containing propylene as a main component is continuously carried out by feeding monomers, ethylene/(ethylene+propylene)=from 0 to 5% by wight in a polymerization vessel having 2 or more than 2 tanks in series, with use of a catalyst system combining (A) a solid catalyst component containing titanium, magnesium, halogen and polyvalent carboxylic ester as essential components, (B) an organic aluminium compound, as well as (C) an organic silicon compound expressed by the general formula $R^4_x R^5_y Si(OR^6)_z$ (wherein, $R^4$ and $R^6$ denote hydrocarbon groups, $R^5$ denotes a hydrocarbon group or a hydrocarbon group containing (a) hetero atom(s), x+y+z=4, $0 \leq x \leq 2$, $1 \leq y \leq 3$, and $1 \leq z \leq 3$) to prepare from 60 to 95% of polymer based on the total weight of the final polymer, and as the second step (D) a glycol type compound expressed by the general formula (1)

$$R^1\!-\!(O\!-\!CH_2\!-\!C(R^3)H\!-\!)_n\!-\!OR^2 \qquad (1)$$

(wherein, n is $3 \leq n \leq 100$, $R^1$ and $R^2$ are hydrogen atoms, monovalent organic groups having from 1 to 20 carbon atoms, or monovalent organic groups having (a) hetero atom(s) such as (an) oxygen, nitrogen, phosphorus or silicon atom(s) and from 1 to 20 carbon atoms, herein $R^1$ and $R^2$ may be identical or different, and $R^3$ is a hydrogen atom or a monovalent organic group having from 1 to 5 carbon atoms) is added continuously to the polymerization reaction mixture obtained in the first step in an amount of (D)/Ti= from 1 to 100 (mole/atom) based on the titanium component in the above-mentioned (A), then a polymerization procedure (II) containing ethylene in a relatively large quantity is continuously carried out by feeding monomers, ethylene/(ethylene+propylene)=from 10 to 100% by weight, to prepare from 5 to 40% based on the total weight of the final polymer, as well as
in that MFR(h), MFR(l), MFR(i) and MFR(ii) are controlled in such a way that the maximum value (hereinafter referred to MFR(h)) and minimum value (hereinafter referred to MFR(l)) of melt flow rate of the polymer obtained in each tank of the polymerization procedure (I) have the following relationship:

$0.1 \leq Log(MFR(h)/MFR(l)) \leq 1$, and a melt index of the polymer obtained in the polymerization procedure (I) containing propylene as a main component (hereinafter referred to MFR(i)) and a melt index of the polymer obtained in the polymerization procedure (II) containing ethylene in a relatively large quantity (hereinafter referred to MFR(ii)) have the following relationship:

$3 \leq Log(MFR(i)/MFR(ii)) \leq 7$.

(2) A continuous process for preparation according to the above-mentioned (1), wherein the molar ratio between (C) the organic silicon compound and (B) the organic aluminium compound has the following relationship:

B/C=from 1 to 15, wherein, the melt flow rate being determined according to ASTM D-1238 at a temperature of 230° C. under a load of 2.16 kg.

The structure and the effect of the invention are described in detail as follows.

According to the invention, a highly stereoregular catalyst system is used as a polymerization catalyst which is obtained by using (A) a solid catalyst component containing at least magnesium atom, titanium atom, halogen atom and multivalent carboxylic ester, (B) an organic aluminium compound and (C) an electron donating compound, but there is not any special limitation as to the catalyst thus it is possible to use various known catalyst systems giving highly stereoregular polypropylene.

As processes for preparation of such solid catalyst component (A), processes disclosed in the following official gazettes may be used for the preparation: for example, Toku Kai Sho 50-108385, 50-126590, 51-20297, 51-28189, 51-64586, 51-92885, 51-136625, 52-87489, 52-100596, 52-147688, 52-104593, 53-2580, 53-40093, 53-40094, 55-135102, 55-135103, 55-152710, 56-811, 56-11908, 56-18606, 58-83006, 58-138705, 58-138706, 58-138707, 58-138708, 58-138709, 58-138710, 58-138715, 60-23404, 61-21109, 61-37802, 61-37803, 62-104810, 62-104811, 62-104812, 62-104813 and 63-54405 etc.

As the multivalent carboxylic esters used in the above-mentioned solid component (A), esters of phthalic acid, maleic acid, substituted malonic acid etc. with alcohols having 2 or more than 2 carbon atoms are concrete examples.

There are various magnesium compounds used in the above-mentioned (A) according to the invention, wherein magnesium compounds with or without reducing ability may be used.

As examples of the former, there may be mentioned dimethyl magnesium, diethyl magnesium, dipropyl magnesium, dibutyl magnesium, ethyl magnesium chloride, propyl magnesium chloride and butyl magnesium chloride etc.

As examples of the latter, there may be mentioned magnesium halides such as magnesium chloride, magnesium bromide and magnesium iodide; alkoxy magnesium chlorides such as methoxy magnesium chloride and ethoxy magnesium chloride; alkoxy magnesiums such as ethoxy magnesium, isopropoxy magnesium and butoxy magnesium; as well as carboxylic magnesiums such as magnesium laurate and magnesium stearate, etc.

Amongst thereof, the particularly preferable compounds are magnesium halides, alkoxy magnesium chlorides and alkoxy magnesiums.

As the titanium compounds used in the solid catalyst component (A) according to the invention, compounds generally expressed by $Ti(OR)_A X_{4-A}$ (wherein, R is a hydrocarbon group, X is halogen, and $0 \leq A \leq 4$) are most suitable. Concretely, those are titanium tetrahalides such as $TiCl_4$ and $TiBr_4$ etc.; alkoxy titanium tri-halides such as $Ti(OCH_3)Cl_3$ and $Ti(OC_2H_5)Cl_3$ etc., dialkoxy titanium dihalides such as $Ti(OCH_3)_2Cl_2$ and $Ti(OC_2H_5)_2Cl_2$ etc.; trialkoxy titanium monohalides such as $Ti(OCH_3)_3Cl$ and $Ti(OC_2H_5)_3Cl$ etc.;

as well as tetraalkoxy titaniums such as $Ti(OCH_3)_4$ and $Ti(OC_2H_5)_4$ etc., and the particularly preferable one is $TiCl_4$.

In the preparation of the solid catalyst component (A), the other electron donors such as alcohols, ethers, phenols, silicon compounds and aluminium compounds etc. may be present if required in addition to the above-mentioned titanium compounds, magnesium compounds and multivalent carboxylic esters.

As the organic aluminium compounds (B) used according to the invention, the organic aluminium compounds expressed by the general formula of $AlR^2_m R^3_n X_{3-(m+n)}$ (wherein, $R^2$ and $R^3$ denote hydrocarbon groups or alkoxy groups, X denotes halogen, m and n denote such optional numbers that $0 \leq m \leq 3$, $0 \leq n \leq 3$ and $1.5 \leq m+n \leq 3$) may be used.

As concrete examples, there may be mentioned trimethyl aluminium, triethyl aluminium, tri-n-propyl aluminium, tri-n-butyl aluminium, tri-i-butyl aluminium, diethyl aluminium chloride, di-n-propyl aluminium monochloride, diethyl aluminium iodide, methyl aluminium sesquichloride, ethyl aluminium sesquichloride and ethoxy diethyl aluminium etc.

These organic aluminium compounds (B) may be used alone or used in mixture of 2 or more than 2 compounds.

As the electron donating components (C) used according to the invention, the organic silicon compounds expressed by the general formula $R^4_x R^5_y Si(OR^6)_z$ (wherein, $R^4$ and $R^6$ denote hydrocarbon groups, $R^5$ denotes a hydrocarbon group or a hydrocarbon group containing (a) hetero atom(s), x+y+z=4, $0 \leq x \leq 2$, $1 \leq y \leq 3$ and $1 \leq z \leq 3$) may be used.

As concrete examples, there may be mentioned methyl trimethoxy silane, methyl triethoxy silane, methyl tripropoxy silane, ethyl trimethoxy silane, ethyl triethoxy silane, ethyl tripropoxy silane, n-propyl trimethoxy silane, n-propyl triethoxy silane, i-propyl trimethoxy silane, i-propyl triethoxy silane, n-butyl trimethoxy silane, n-butyl triethoxy silane, i-butyl trimethoxy silane, i-butyl triethoxy silane, t-butyl trimethoxy silane, t-butyl triethoxy silane, n-pentyl trimethoxy silane, n-pentyl triethoxy silane, neopentyl trimethoxy silane, neopentyl triethoxy silane, hexadecyl trimethoxy silane, hexadecyl triethoxy silane, dimethyl dimethoxy silane, dimethyl diethoxy silane, diethyl dimethoxy silane, diethyl diethoxy silane, di-n-propyl dimethoxy silane, di-i-propyl dimethoxy silane, di-n-butyl dimethoxy silane, di-i-butyl dimethoxy silane, di-t-butyl dimethoxy silane, di-n-pentyl dimethoxy silane, dineopentyl dimethoxy silane, diphenyl trimethoxy silane, phenyl triethoxy silane, diphenyl dimethoxy silane, diphenyl diethoxy silane, cyclohexyl trimethoxy silane, cyclohexyl triethoxy silane, dicyclohexyl dimethoxy silane, dicyclohexyl diethoxy silane, 3-mercaptopropyl methyl dimethoxy silane, 3-isocyanatopropyl triethoxy silane and 2-(3-cyclohexenyl) ethyl trimethoxy silane etc.

These organic silicon compounds may be used alone or used in mixture of 2 or more than 2 kinds at an optional proportion. Amongst them, the particularly preferable organic silicon compounds are di-i-propyl dimethoxy silane, t-butyl triethoxy silane, t-butyl trimethoxy silane, i-butyl trimethoxy silane and cyclohexyl trimethoxy silane. The preferable amount of the organic silicon compound (C) added to the said organic aluminium compound (B) is the molar ratio (B)/(C)=from 1 to 15, and wherein if the amount is less, improvement in rigidity is insufficient, and if it is more, the catalyst activity is decreased, both of which are not practical.

The said solid product (A) is then combined with the organic aluminium compound (B) and the above-mentioned organic silicon compound (C) to be used as a catalyst for polymerization, or more preferably it is reacted with α-olefin to be used as a pre-activated catalyst. Pre-activation is desirably carried out by reacting from 0.3 to 20 moles of the organic aluminium (B) with from 0.1 to 10 moles, preferably from 0.3 to 3 moles of α-olefin at from 0° to 50° C. for from 1 minute to 20 hours based on 1 mole of titanium in the solid product (A).

The reaction with α-olefin for the pre-activation may be carried out in an aliphatic or aromatic hydrocarbon solvent or in liquified α-olefin such as liquified propylene and liquified butene-1 without any solvent, or ethylene and propylene etc. may be reacted in gaseous phase. Also, the previously obtained α-olefin polymer or hydrogen may be present together. Furthermore, the organic silane compound (C) may be added already in the pre-activation.

α-Olefins used for the pre-activation are ethylene, propylene, butene-1, hexene-1, heptene-1, other straight-chain monoolefins, branched monoolefins such as 4-methyl-pentene-1, 2-methyl-pentene-1 and 3-methyl-butene-1, as well as styrene etc. These α-olefins may be used in mixture with α-olefin, that is, the polymerization subject.

After end of the pre-activation, the solvent, the organic aluminium compound and the unreacted α-olefin as well as the organic aluminium compound may be removed by filtration or decantation, dried and used as granular materials.

The pre-activated catalyst thus obtained may be used for slurry polymerization of propylene carried out in a hydrocarbon solvent such as n-hexane, n-heptane, n-octane, benzene and toluene etc. or for bulk polymerization and gaseous polymerization carried out in liquefied propylene.

In the case of slurry polymerization, it is generally carried out at a polymerization temperature of from 20° to 90° C., preferably from 50° to 80° C., and under a polymerization pressure of from 0.1 to 5 MPs. In the case of gaseous polymerization, it is generally carried out at a polymerization temperature of from 20° to 150° C. and under a polymerization pressure of from 0.2 to 5 MPs. Hydrogen is generally used for control of molecular weight, and polymerization is carried out such a way that MFR of the obtained polymer ranges within from 0.1 to 1,000.

According to the invention, after mixing the glycol type compound (D) and the crystalline homopolymer or copolymer of propylene prepared in the former polymerization step in the polymerization procedure (I) with use of the above-mentioned catalyst system, propylene and other α-olefin are random copolymerized in the presence of the above-mentioned polymer or copolymer in the latter polymerization step in the polymerization procedure (II).

As the monomer composition fed to the polymerization procedure (I), ethylene/(ethylene+propylene)=from 0 to 5% by weight is used. More than 5% by weight of ethylene may cause a disadvantage to lower physical properties such as rigidity and thermal resistance etc., the characteristics of polypropylene.

Furthermore, 1-butene, 4-methyl pentene-1, styrene and non-conjugated diene etc. may be added and fed as the third monomer component in an amount of from 0 to 10% based on propylene.

The polymerized amount in the polymerization procedure (I) is from 60 to 95% by weight based on the total ethylene-propylene block copolymer to be obtained finally. In the case that the polymerized amount being less than the above-mentioned range, rigidity of product is lowered, and in the case that the amount being more than the range, improvement in low-temperature impact resistance is insufficient.

Polymerization in the polymerization procedure (I) is carried out by using 2 or more than 2 polymerization vessels connected in series, wherein the relationship between the maximum value (MFR(h)) and minimum value (MFR(l)) of melt flow rate of polymer obtained in each tank is preferably 0.1≦Log(MFR(h)/MFR(l))≦1, and more preferably 0.2≦Log(MFR(h)/MFR(l))<0.5.

In the case that the said MFR ratio being less than the above-mentioned range, rigidity of product is lowered, and in the case that the amount being more than the range, tensile elongation and impact resistance of the propylene-ethylene block copolymer obtained finally are lowered, both of which are not preferable.

After end of the polymerization procedure (I), the polymerized slurry, that is, the polymerization reaction mixture, is taken out and sent to the polymerization procedure (II).

As a process for adding the glycol type compound, it is possible to mount a tank (for example, a separation tank for propylene monomer) between the polymerization procedure (I) and the polymerization procedure (II) and add the compound to the tank, or it is also possible to add the compound directly to the polymerization procedure (II) and mix with.

As the above-mentioned glycol type compounds (D) to be used essentially in the process according to the invention, those expressed by the general formula (1):

$$R^1-(O-CH_2-C(R^3)H-)_n-OR^2 \qquad (1)$$

(wherein, n is 3≦n≦100, $R^1$ and $R^2$ are hydrogen atoms, monovalent organic groups having from 1 to 20 carbon atoms, or monovalent organic groups having from 1 to 20 carbon atoms containing (a) hetero atom(s) such as oxygen, nitrogen, phosphorus, sulfur and silicon etc., herein $R^1$ and $R^2$ may be identical or different, and $R^3$ is a hydrogen atom or a monovalent organic group having from 1 to 5 carbon atoms, may be mentioned.

As concrete examples, there may be mentioned triethylene glycol, tetraethylene glycol, hexaethylene glycol, heptaethylene glycol, polyethylene glycol, diethylene glycol monoalkyl ether, triethylene glycol monoalkyl ether, tetraethylene glycol monoalkyl ether, hexaethylene glycol monoalkyl ether, heptaethylene glycol monoalkyl ether, polyethylene glycol monoalkyl ether, triethylene glycol dialkyl ether, tetraethylene glycol dialkyl ether, hexaethylene glycol dialkyl ether, heptaethylene glycol dialkyl ether, polyethylene glycol dialkyl ether, triethylene glycol monoalkyl ester, tetraethylene glycol monoalkyl ester, hexaethylene glycol monoalkyl ester, heptaethylene glycol monoalkyl ester, polyethylene glycol monoalkyl ester, triethylene glycol dialkyl ester, tetraethylene glycol dialkyl ester, hexaethylene glycol dialkyl ester, heptaethylene glycol dialkyl ester, polyethylene glycol dialkyl ester, tripropylene glycol monoalkyl ether, tetrapropylene glycol monoalkyl ether, hexapropylene glycol monoalkyl ether, heptapropylene glycol monoalkyl ether, polypropylene glycol monoalkyl ether etc., wherein a straight-chain hydrocarbon having from 1 to 20 carbon atoms being mentioned as an alkyl group, as well as tetraethylene glycol monoacrylate, hexaethylene glycol monoacrylate, heptaethylene glycol monoacrylate, polyethylene glycol monoacrylate, diethylene glycol diacrylate, triethylene glycol diacrylate, tetraethylene glycol diacrylate, hexaethylene glycol diacrylate, heptaethylene glycol diacrylate, polyethylene glycol diacrylate, diethylene glycol monomethacrylate, triethylene glycol monomethacrylate, tetraethylene glycol monomethacrylate, hexaethylene glycol monomethacrylate, heptaethylene glycol monomethacrylate, polyethylene glycol monomethacrylate, triethylene glycol dimethacrylate, tetraethylene glycol dimethacrylate, hexaethylene glycol dimethacrylate, heptaethylene glycol dimethacrylate and polyethylene glycol dimethacrylate etc.

An amount of these glycol type compound (D) used varies according to the kinds, but it is used such an amount that (D)/Ti=from 1 to 100 moles/atom ratio based on titanium in the solid catalyst component (A). That is, the said (D) is case without adding the glycol type compound (D). If the added amount being too much, the activity in the polymerization procedure (II) lowers much, which is not preferable economically. On the contrary, if (D) being too little, the effect of the selective inactivation of the above-mentioned short pass catalyst becomes insufficient, which is also not preferable.

The reason why the glycol type compound (D) used according to the invention has remarkably superior effects compared to the conventional known ketones, amines, amides, alkyl ethers, carboxylic esters and halides is considered that (D) has much oxygen atoms coordinated in the catalyst, which form a complex having suitable viscosity with the organic aluminium compound (B) to suppress diffusion of (B) into inside of the polymer particle and inactivate the short cut pass catalyst preferentially due to less polymer particle containing the short cut pass catalyst.

That is, essential conditions are supposedly that (B) and (D) form a complex having suitable viscosity and that the complex has the property to permeate difficultly into inside of the polymer particle.

The polymerization procedure (II) is generally carried out at a polymerization temperature of from 20° to 80° C., preferably from 40° to 70° C., and under a pressure of from 0.1 to 5 MPa. For control of molecular weight, hydrogen is used at a concentration of from 0.1 to 10 mole % in gaseous phase. The ratio between ethylene and propylene fed to the polymerization procedure (II) is ethylene/(ethylene+propylene)=from 10 to 100% by weight, preferably from 20 to 70% by weight, and the polymerized amount is from 5 to 40% by weight based on the final propylene-ethylene block copolymer.

Furthermore, other olefins or non-conjugated diens etc. may be used together with propylene. The relationship between MFR(i) obtained in the polymerization procedure (I) and MFR(ii) obtained in the polymerization procedure (II) is preferably 3≦Log(MFR(i)/MFR(ii))≦7, more preferably 4≦Log(MFR(i)/MFR(ii))≦6.

MFR(i) is the determined value as to the polymer in the polymerization procedure (I), and MFR(ii) is the calculated value according to the following equations (2) and (3) from MFR(i), the determined MFR value after end of the second step {referred to MFR(i+ii)}, the polymer ratio (W1) in the polymerization procedure (I) and the polymer ratio (W2) in the polymerization procedure (II):

LogMFR(T)=W1×LogMFR(i)+W2×LogMFR(ii)  (2)

W1+W2=1.  (3),

In the case of Log(MFR(i)/MFR(ii))<3, the obtained polymer is not preferable because of inferior low-temperature impact strength and tensile elongation. Furthermore, the formed amount of the polymer soluble in the polymerization solvent is increased, which is not preferable from viewpoints of economy and plant operation. Also, in the case of Log(MFR(i)/MFR(ii))>7, nonuniform particles with the so-called fish eyes are remarkably increased and low-temperature impact strength lowers, both of which are not preferable.

Analyzing and determining methods of the physical properties for the examples mentioned below are shown as follows.

Ethylene content; by infrared absorption spectrum method. (unit; % by weight)

Polymerized amount ratio (W1, W2) between the polymerization procedure (I) and the polymerization procedure (II); copolymers are previously prepared with varying the reacted amount ratio of ethylene/propylene, the copolymers are used as standard samples to make a working curve and obtain the reacted amount ratio of ethylene/propylene in the polymerization procedure (II), and then calculate the amount from the ethylene content in the total polymer.
(weight/weight)

Bending elasticity; according to JIS K7203 (unit; MPa).
Tensile strength; according to JIS K7113 (unit; MPa).
Tensile elongation; according to JIS K7113 (unit; %)
HDT; according to JIS K7207 (unit; °C.).
Izod impact strength (II); according to JIS K7110 (unit; J/m).

As described above, the invention make it possible to attain more effect than the known arts by using the specified polymerization conditions, and the invention is explained more concretely by means of Examples but it is not limited by them.

EXAMPLES

Example 1

(Preparation of a catalyst—preparation of a solid titanium catalyst component)

After a mixture of 150 g of magnesium ethoxide, 275 ml of 2-ethyl hexyl alcohol and 300 ml of toluene was stirred under an atmosphere of carbon dioxide of 0.3 MPa at 93° C. for 3 hours, additional 400 ml of toluene and 400 ml of n-decane were added. Hereinafter, the solution is referred to a magnesium carbonate solution.

100 ml of toluene, 30 ml of chlorobenzene, 9 ml of tetraethoxy silane, 8.5 ml of titanium tetrachloride and 100 ml of Isopearl G (isoparaffin type hydrocarbon having 10 carbon atoms on average, boiling point: from 156° to 176° C.) were stirred at 30° C. for 5 minutes, and then 50 ml of the above-mentioned magnesium carbonate solution was added.

After it was stirred for 5 minutes, 22 ml of tetrahydrofuran was added and stirred at 60° C. for 1 hour. After stirring was stopped and the supernatant was removed, the produced solid was washed with 50 ml of toluene. To the obtained solid, 100 ml of chlorobenzene and 100 ml of titanium tetrachloride were added and stirred at 135° C. for 1 hour. After stirring was stopped and the supernatant was removed, 250 ml of chlorobenzene, 100 ml of titanium tetrachloride and 2.1 ml of di-n-butyl phthalate were added and stirred at 135° C. for 1.5 hours.

After removal of the supernatant, the solid was washed subsequently with 600 ml of toluene, 800 ml of Isopearl G and 400 ml of hexane, to take out a solid catalyst component. The compositions of the solid catalyst component were 2.3% by weight of titanium, 55% by weight of chlorine, 17% by weight of magnesium and 7.5% by weight of di-n-butyl phthalate.

(Preparation of a pre-activated catalyst)

After a stainless reactor equipped with declined propellers having an inner volume of 50 L was substituted with nitrogen gas, 40 L of n-hexane was introduced, 75 g of the above-mentioned solid product and 13 g of triethyl aluminium were added at a room temperature, thereafter 100 g of propylene was fed for 120 minutes, and then the unreacted propylene was removed, to obtain a pre-activated catalyst slurry.

(Polymerization process)

Polymerization was carried out by means of the device shown in FIG. 2.

Polymerization procedure (1)

7 kg/hour of propylene, 26 L/hour of n-hexane, 8.9 g/hour of triethyl aluminium and 6.9 g/hour of di-i-propyl dimethoxy silane as the organic silicon compound were subsequently fed into a 200 L polymerization vessel 1, and the pre-activated slurry (400 ml/hour) was added in such a way that the inner temperature became 70° C. and the total pressure became 0.8 MPa, and the first step polymerization was carried out by feeding propylene and hydrogen with maintaining a hydrogen/propylene concentration ratio in a gaseous phase at 0.24.

Subsequently, a part of the polymerization slurry was taken out, and fed for determination of MFR, to obtain a polymer yield per a catalyst unit weight by carrying out an induced bonding plasma emission spectral analysis (ICP method) of Mg content in the polymer. Subsequently, the second step polymerization was carried out by feeding propylene and hydrogen with maintaining the inner temperature at 70° C., the total pressure at 1.0 MPa and the hydrogen/propylene concentration ratio at 0.24, and thereafter the slurry left from the polymerization vessel 2 was fed to a pressure reducing tank 3.

The pressure reducing tank 3 was controlled at 60° C. and under 0.5 kg/cm²G, and tetraethylene dimethyl ether was added at 10.0 mole of the solid catalyst/mole of Ti in the solid catalyst. Then, a part of the polymerized slurry was taken out, and determination of MFR was carried out, and simultaneously Mg content in the polymer was obtained by ICP method, to give a polymer yield of the second step. Then, the ratio of polymerized amounts between the first step and the second step by using the above-mentioned yield of the first step. Furthermore, values of $MFR_1$ and FMR were introduced in the following equation:

$$LogMFR = a \times LogMFR_1 + (1-a) \times LogMFR_2$$

wherein, a: polymerization ratio in the first step MFR: MFR in the taken product after end of the second step $MFR_1$ and $MFR_2$: MFR in the first step and in the second step, to give $MFR_2$ in the second step. The slurry taken from the pressure reducing tank 3 was fed into polymerization vessel 4.

Polymerization step (2)

The polymerization vessel 4 was maintained at 60° C., and 1.7 kg/hour of propylene, 0.5 kg/hour of ethylene and hydrogen in such an amount that gaseous hydrogen concentration became 1 mole % were fed. The pressure of the slurry left from the polymerization vessel 4 was reduced in a pressure reducing tank 5 and the catalyst was deactivated with methanol, and then the powdery product (about 8 kg/hour) was recovered by means of neutralization with a potassium soda solution, washing with water, and separation of powders.

Preparation of injection mold

To 3.0 kg of the above-mentioned obtained powdery product, 0.003 kg of a phenol type thermal stabilizer and 0.003 kg of calcium stearate, and they were stirred in a high speed stirring mixture (note: Henshel mixer, trade name) at the room temperature for 10 minutes and granulated with use of an extrusion granulator having a screw diameter of 40 mm. Then, the said granulates were molded in an injection molding machine at a molten resinous temperature of 230° C. and a mold temperature of 50° C. to produce test pieces having JIS form, and the said test pieces were conditioned at a humidity of 50% and a room temperature of 23° C. for 72 hours. Then, physical properties as shown in Table 1 were determined as follows.

Determination of fish eye (FE)

The said granulates were made to film with a thickness of 0.03 mm by means of 40 mm T die (a lip width of 30 cm) made by Yamaguchi Seisakusho (Co. Ltd.), and the number of foreign matters having diameter of more than 0.1 mm was determined by means of FE counter made by Yasukawa Examples 2 and 3, Comparative Examples 2 and 3

The procedures were carried out similarly to Example 1 except for changing the added amounts of di-i-propyl dimethoxy silane to 2.8 g/hour, 1.4 g/hour, 0.7 g/hour and 17.3 g/hour, and those of the said pre-activated catalyst slurry to 340 ml/hour, 270 ml/hour, 260 ml/hour and 830 ml/hour, and the results were shown in Table 1.

In the case that the molar ratio between the organic silicon compound (C) and the organic aluminium compound (B) (B/C) was more than that of this invention, the obtained product has less rigidity, and in the case that the ratio was less than that of the invention, the catalyst activity (yield of polymer per an unit catalyst) is lowered, both of which are not practical.

TABLE 1

POLYMERIZATION RESULT AND PHYSICAL PROPERTY OF THE PRODUCTS

|  |  | Example 1 | Comparative Example 1 | Example 2 | Example 3 | Comparative Example 2 | Comparative Example 3 |
|---|---|---|---|---|---|---|---|
| Solid Catalyst Component (A) |  | This Invention | → | → | → | → | → |
| Organic Mininum Compound (B) |  | TEA | → | → | → | → | → |
| Organic Silicon Compound (C) |  | DiPDMS* | → | → | → | → | → |
| B/C Molar Ratio |  | 2 | 2 | 5 | 10 | 20 | 0.8 |
| Polymerization Process (I) |  |  |  |  |  |  |  |
| 1st Step MFR | g/10 min | 122 | 124 | 125 | 118 | 120 | 119 |
| 2nd Step MFR | g/10 min | 72 | 73 | 71 | 81 | 75 | 73 |
| log MFR (h)/MFR (1) |  | 0.23 | 0.23 | 0.25 | 0.16 | 0.2 | 0.21 |
| Ratio of Polymerization Amount 1st Step:2nd Step |  | 55:45 | 55:45 | 53:47 | 51:49 | 53:47 | 54:46 |
| MFR (i) | g/10 min | 96 | 95 | 96 | 98 | 98 |  |
| Glycol Compound (D) |  | A* | — | A* | A* | A* | A* |
| D/Ti in Catalyst Molar Ratio |  | 10 | — | 10 | 10 | 10 | 10 |
| Polymerization Process (II) |  | 0.005 | 0.006 | 0.006 | 0.004 | 0.005 | 0.005 |
| MFR (ii) | g/10 min |  |  |  |  |  |  |
| Ratio of Polymerization Amount Polymerization(I):Polymerization(II) |  | 88:12 | 87:13 | 87:13 | 88:12 | 87:13 | 87:13 |
| Product Powder |  |  |  |  |  |  |  |
| MFR | g/10 min | 29 | 27 | 27 | 29 | 27 | 26 |
| log (MFR (i)/MFR (ii)) |  | 4.3 | 4.2 | 4.2 | 4.3 | 4.3 | 4.3 |
| R - E* | wt % | 48 | 48 | 51 | 49 | 50 | 52 |
| T - E* | wt % | 6.3 | 6.4 | 6.4 | 5.9 | 6.5 | 6.8 |
| Catalyst Activity* | g/g-(A) | 9300 | 9400 | 11000 | 14000 | 14500 | 4500 |
| Soluble Polymer | % | 2.2 | 2.3 | 2.5 | 2.8 | 5.1 | 3.2 |
| Injection Mold |  |  |  |  |  |  |  |
| Bending Elasticity | MPa | 1580 | 1570 | 1540 | 1520 | 1350 | 1520 |
| Tensile Strength | MPa | 39 | 39 | 38 | 38 | 36 | 38 |
| Tensile Elongation | % | 350 | 120 | 390 | 440 | 165 | 182 |
| HDT | °C. | 119 | 119 | 118 | 118 | 112 | 117 |
| I I* | J/m | 99 | 89 | 101 | 97 | 95 | 96 |
| F E | piece/1000 cm$^2$ | 3 | 1000 | 2 | 5 | 10 | 12 |

Note.
A*: Tetraethylenedimethylether
DiPDMS*: Di-i-Propyldimethoxysilane
R - E*: Ethylene Content in Polymerized part in Polymerization Step (II)
T - E*: Ethylene Content in Total Polymer
Catalyst Activity*: Powder Yield per Solid Catalyst (g/g)
I I*: Izot Impact Denki (Co. Ltd.). The determined area was 30,000 cm$^2$ and it was calculated on 1,000 cm$^2$ basis. The results were shown in Table 1.

Comparative Example 1

The procedure was carried out similarly to Example 1 except for not adding tetraetylene glycol dimethyl ether. The results were shown in Table 1.

Examples 4 and 5, Comparative Examples 4 and 5

The procedures were carried out similarly to Example 2 except for changing the hydrogen/propylene concentration ratios in the gaseous part in the first step to 0.35, 0.18, 0.22 and 0.45, as well as the hydrogen/propylene concentration ratios in the gaseous part in the second step to 0.16, 0.35, 0.27 and 0.11 in the polymerization procedure (I), and the results were shown in Table 2.

In the cases that the value of log(MFR(h)/MFR(l)) being less than this invention, the rigidity of the molding was inferior to the invention, and in the cases that the value being more than the invention, the impact resistance of the molding was inferior.

Comparative Examples 6 and 7

The procedures were carried out similarly to Example 2 except for changing the hydrogen/propylene concentration ratios in the gaseous parts in the first step and the second step to 0.35 and 0.18 in the polymerization procedure (I), and the

TABLE 2

POLYMERIZATION RESULT AND PHYSICAL PROPERTY OF THE PRODUCTS

|  |  | Example 4 | Example 5 | Comparative Example 4 | Comparative Example 5 |
|---|---|---|---|---|---|
| Solid Catalyst Component (A) |  | This Invention | → | → | → |
| Organic Aluminum Compound (B) |  | TEA | → | → | → |
| Organic Silicon Compound (C) |  | DiPDMS* | → | → | → |
| B/C Molar Ratio |  | 5 | 5 | 5 | 5 |
| Polymerization Process (I) |  |  |  |  |  |
| 1st Step MFR | g/10 min | 200 | 75 | 105 | 300 |
| 2nd Step MFR | g/10 min | 37 | 127 | 90 | 24 |
| log MFR (h)/MFR (l) |  | 0.7 | 0.23 | 0.067 | 1.1 |
| Ratio of Polymerization Amount | | 55:45 | 55:45 | 50:50 | 56:44 |
| 1st Step:2nd Step |  |  |  |  |  |
| MFR (i) | g/10 min | 94 | 95 | 97 | 98 |
| Glycol Compound (D) |  | A* | A* | A* | A* |
| D/Ti in Catalyst Molar Ratio |  | 10 | 10 | 10 | 10 |
| Polymerization Process (II) |  | 0.006 | 0.005 | 0.005 | 0.005 |
| MFR (ii) | g/10 min |  |  |  |  |
| Ratio of Polymerization Amount |  | 88:12 | 87:13 | 87:13 | 88:12 |
| Polymerization(I):Polymerization(II) |  |  |  |  |  |
| Product Powder |  |  |  |  |  |
| MFR | g/10 min | 29 | 26 | 28 | 30 |
| log(MFR (i)/MFR (ii)) |  | 4.3 | 4.3 | 4.3 | 4.3 |
| R - E* | wt % | 48 | 52 | 51 | 51 |
| T - E* | wt % | 6.3 | 6.8 | 6.4 | 6.4 |
| Catalyst Activity* | g/g-(A) | 11100 | 10000 | 11000 | 10000 |
| Soluble Polymer | % | 2.2 | 2.3 | 2.5 | 2.6 |
| Injection Mold |  |  |  |  |  |
| Bending Elasticity | MPa | 1600 | 1530 | 1480 | 1560 |
| Tensile Strength | MPa | 40 | 38 | 36 | 37 |
| Tensile Elongation | % | 255 | 440 | 390 | 30 |
| HDT | °C. | 120 | 118 | 115 | 117 |
| I I* | J/m | 96 | 102 | 99 | 86 |
| F E | piece/1000 cm$^2$ | 5 | 4 | 7 | 5 |

Example 6

The procedure was carried out similarly to Example 2 except for changing the hydrogen/propylene concentration ratios in the gaseous parts in the first step and the second step to 0.35 in the polymerization procedure (I), and the gaseous hydrogen concentration to 0.2 mole % in the polymerization procedure (II), and the results were shown in Table 3.

Example 7

The procedure was carried out similarly to Example 2 except for changing the hydrogen/propylene concentration ratios in the gaseous parts in the first step and the second step to 0.20 in the polymerization procedure (I), and the gaseous hydrogen concentration to 3 mole % in the polymerization procedure (II), and the results were shown in Table 3.

gaseous hydrogen concentrations to 0.05 mole % and 10 mole % in the polymerization procedure (II), and the results were shown in Table 3.

In the case that the MFR ratio between the polymerization procedure (I) and the polymerization procedure (II) (Log (MFR(i)/MFR(ii)) being more than this invention, impact resistance was inferior, and in the cases that those being less than the invention, rigidity, impact resistance and tensile elongation were inferior to those of the invention, as well as the soluble polymers in the polymerization solvent were produced more, which are not preferable.

TABLE 3

POLYMERIZATION RESULT AND PHYSICAL PROPERTIES OF THE PRODUCTS

|  |  | Example 6 | Example 7 | Comparative Example 6 | Comparative Example 7 |
|---|---|---|---|---|---|
| Solid Catalyst Component (A) |  | This Invention | → | → | → |
| Organic Aluminum Compound (B) |  | TEA | → | → | → |
| Organic Silicon Compound (C) |  | DiPDMS* | → | → | → |
| B/C Molar Ratio |  | 5 | 5 | 5 | 5 |
| Polymerization Process (I) |  |  |  |  |  |
| 1st Step MFR | g/10 min | 250 | 100 | 400 | 70 |
| 2nd Step MFR | g/10 min | 124 | 48 | 211 | 38 |
| log MFR (h)/MFR (1) |  | 0.3 | 0.32 | 0.28 | 0.27 |
| Ratio of Polymerization Amount 1st Step:2nd Step |  | 51:49 | 52:48 | 55:45 | 51:49 |
| MFR (i) | g/10 min | 177 | 70 | 300 | 52 |
| Glycol Compound (D) |  | A* | A* | A* | A* |
| D/Ti in Catalyst Molar Ratio |  | 20 | 5 | 20 | 5 |
| Polymerization Process (II) |  | 0.00005 | 0.05 | 0.00001 | 0.2 |
| MFR (ii) | g/10 min |  |  |  |  |
| Ratio of Polymerization Amount Polymerization(I):Polymerization(II) |  | 88:12 | 87:13 | 87:13 | 88:12 |
| Product Powder |  |  |  |  |  |
| MFR | g/10 min | 29 | 28 | 32 | 27 |
| log(MFR (i)/MFR (ii)) |  | 6.5 | 3.1 | 7.5 | 2.4 |
| R - E* | wt % | 48 | 51 | 51 | 51 |
| T - E* | wt % | 6.3 | 6.4 | 6.4 | 6.4 |
| Catalyst Activity* | g/g-(A) | 10500 | 11200 | 9800 | 11000 |
| Soluble Polymer | % | 1.8 | 3 | 2 | 6.5 |
| Injection Mold |  |  |  |  |  |
| Bending Elasticity | MPa | 1610 | 1540 | 1550 | 1420 |
| Tensile Strength | MPa | 40 | 38 | 38 | 36 |
| Tensile Elongation | % | 440 | 180 | 220 | 50 |
| HDT | °C. | 120 | 118 | 118 | 115 |
| I I* | J/m | 106 | 97 | 95 | 88 |
| F E | piece/1000 cm$^2$ | 25 | 1 | 330 | 1 |

Example 8

The procedure was carried out similarly to Example 3 except for changing the hydrogen/propylene concentration ratios in the gaseous parts in the first step and the second step to 0.08 and the added amount of tetraethylene glycol dimethyl ether in the pressure reducing tank 3 to 5 moles/mole of Ti in the polymerization procedure (I), as well as the gaseous hydrogen concentration to 0.5 mole % and the fed amount of ethylene to 0.25 kg/hour in the polymerization procedure (II), and the results were shown in Table 4.

Example 9

The procedure was carried out similarly to Example 3 except for changing the hydrogen/propylene concentration ratios in the gaseous parts in the first step and the second step to 0.17 and the added amount of tetraethylene glycol dimethyl ether in the pressure reducing tank 3 to 20 moles/mole of Ti in the polymerization procedure (I), as well as the gaseous hydrogen concentration to 0.5 mole %, the fed ratio of ethylene to 65% by weight and the fed amount of ethylene to 1 kg/hour in the polymerization procedure (II), and the results were shown in Table 4.

Comparative Example 8

The procedure was carried out similarly to Example 9 except for using ethyl benzoate as the electron donator in the preparation of the solid catalyst component (A), and the results were shown in Table 4. Rigidity and impact resistance were remarkably inferior compared to the invention.

Comparative Example 9

The procedure was carried out similarly to Example 9 except for using the reductive type catalyst described in the Example of Toku Kai Sho 58-201816 as the solid catalyst component (A), diethyl aluminium chloride as the organic aluminium compound (B) and methyl p-toluylate instead of the organic silicon compound (C), and the results were shown in Table 4. Rigidity and impact resistance were inferior, as well as the yield of the polymer per a catalyst unit was lower compared to the invention.

TABLE 4

POLYMERIZATION RESULT AND PHYSICAL PROPERTY OF THE PRODUCTS

|  |  | Example 8 | Example 9 | Comparative Example 8 | Comparative Example 9 |
|---|---|---|---|---|---|
| Solid Catalyst Conponent (A) |  | This Invention | → | Carrier Type* | Reduction Type* |
| Organic Aluminum Compound (B) |  | TEA | → | → | DEAC |
| Organic Silicon Compound (C) |  | DiPDMS* | → | → | 1* |
| B/C Molar Ratio |  | 10 | 10 | 10 | 10 |
| Polymerization Process (I) |  |  |  |  |  |
| 1st Step MFR | g/10 min | 33 | 64 | 33 | 31 |
| 2nd Step MFR | g/10 min | 14 | 34 | 16 | 19 |
| log MFR (h)/MFR (1) |  | 0.37 | 0.27 | 0.31 | 0.21 |
| Ratio of Polymerization Amount |  | 51:49 | 52:48 | 51:49 | 50:50 |
| 1st Step:2nd Step |  |  |  |  |  |
| MFR (i) | g/10 min | 22 | 47 | 23 | 24 |
| Glycol Compound (D) |  | A* | A* | A* | A* |
| D/Ti in Catalyst Molar Ratio |  | 5 | 20 | 20 | 0.6 |
| Polymerization Process (II) |  | 0.001 | 0.002 | 0.0006 | 0.0005 |
| MFR (ii) | g/10 min |  |  |  |  |
| Ratio of Polymerization Amount |  | 94:6 | 79:21 | 78:22 | 79:21 |
| Polymerization(I):Polymerization(II) |  |  |  |  |  |
| Product Powder |  |  |  |  |  |
| MFR | g/10 min | 12 | 5.7 | 2.3 | 2.5 |
| log(MFR (i)/MFR (ii)) |  | 4.3 | 4.4 | 4.8 | 4.7 |
| R - E* | wt % | 48 | 65 | 66 | 65 |
| T - E* | wt % | 2.9 | 13.7 | 13.9 | 13.7 |
| Catalyst Activity* | g/g-(A) | 15500 | 15200 | 12000 | 3500 |
| Soluble Polymer | % | 1.1 | 3.1 | 6.6 | 6.4 |
| Injection Mold |  |  |  |  |  |
| Bending Elasticity | MPa | 1750 | 1320 | 980 | 1260 |
| Tensile Strength | MPa | 40 | 29 | 22 | 28 |
| Tensile Elongation | % | 440 | >800 | >800 | 55 |
| HDT | °C. | 122 | 110 | 96 | 103 |
| I I* | J/m | 78 | 190 | 152 | 125 |
| F E | piece/1000 cm$^2$ | 1 | 13 | 11 | 33 |

Note.
Carrier Type*: Catalyst in which Ethylbenzoates was used for Electron Donor
Reduction Type*: Catalyst used in the Examples of Tokkaisho 58-201816
1*: Methyl-p-Toluylate was used

Examples 10 to 14

The procedures were carried out similarly to Example 2 except for using t-butyl trimethoxy silane, t-butyl triethoxy silane, i-butyl trimethoxy silane, cyclohexyl trimethoxy silane and di-i-butyl dimethoxy silane as the organic silicon compounds, and the results were shown in Table 5.

TABLE 5

POLYMERIZATION RESULT AND PHYSICAL PROPERTY OF THE PRODUCTS

|  |  | Example 10 | Example 11 | Example 12 | Example 13 | Example 14 |
|---|---|---|---|---|---|---|
| Solid Catalyst Component (A) |  | This Invention | → | → | → | → |
| Organic Aluminum Compound (B) |  | TEA | → | → | → | → |
| Organic Silicon Compound (C) |  | t-BTMS* | t-BTES* | i-BTMS* | SHTMS* | DiBDMS* |
| B/C Molar Ratio |  | 5 | 5 | 5 | 5 | 5 |
| Polymerization Process (I) |  |  |  |  |  |  |
| 1st Step MFR | g/10 min | 130 | 128 | 125 | 133 | 129 |
| 2nd Step MFR | g/10 min | 73 | 69 | 70 | 68 | 73 |
| log MFR (h)/MFR (1) |  | 0.25 | 0.27 | 0.25 | 0.29 | 0.21 |
| Ratio of Polymerization Amount |  | 51:49 | 52:48 | 53:47 | 51:49 | 50:50 |
| 1st Step:2nd Step |  |  |  |  |  |  |
| MFR (i) | g/10 min | 98 | 95 | 95 | 96 | 97 |
| Glycol Compound (D) |  | A* | A* | A* | A* | A* |
| D/Ti in Catalyst Molar Ratio |  | 10 | 10 | 10 | 10 | 10 |
| Polymerization Process (II) |  | 0.005 | 0.006 | 0.006 | 0.006 | 0.005 |
| Ratio of Polymerization Amount |  | 88:12 | 87:13 | 87:13 | 88:12 | 88:12 |

TABLE 5-continued

POLYMERIZATION RESULT AND PHYSICAL PROPERTY OF THE PRODUCTS

|  |  | Example 10 | Example 11 | Example 12 | Example 13 | Example 14 |
|---|---|---|---|---|---|---|
| Polymerization(I):Polymerization(II) Product Powder |  |  |  |  |  |  |
| MFR | g/10 min | 30 | 27 | 27 | 30 | 30 |
| log(MFR (i)/MFR (ii)) |  | 4.3 | 4.2 | 4.2 | 4.2 | 4.3 |
| R - E* | wt % | 51 | 50 | 52 | 49 | 51 |
| T - E* | wt % | 6.1 | 6.5 | 6.8 | 5.9 | 6.1 |
| Catalyst Activity* | g/g-(A) | 10800 | 11100 | 11100 | 10500 | 11200 |
| Soluble Polymer | % | 2.8 | 2.9 | 2.8 | 3.1 | 3.3 |
| Injection Mold |  |  |  |  |  |  |
| Bending Elasticity | MPa | 1530 | 1520 | 1530 | 1540 | 1480 |
| Tensile Strength | MPa | 38 | 38 | 37 | 37 | 36 |
| Tensile Elongation | % | 380 | 375 | 390 | 350 | 380 |
| HDT | °C. | 117 | 116 | 117 | 117 | 116 |
| I I * | J/m | 99 | 102 | 99 | 98 | 101 |
| F E | piece/1000 cm$^2$ | 3 | 5 | 3 | 2 | 4 |

Note.
t-BTMS*: t-Buthyltrimethoxysilane
t-BTES*: t-Buthyltriethoxysilane
i-BTMS*: i-Buthyltrimethoxysilane
SHTMS*: Cyclohexyltrimethoxysilane
DiBDMS*: Di-Isobuthyldimethoxysilane

Comparative Examples 10 to 13

The procedures were carried out similarly to Example 2 except for using methyl p-toluylate, triethylamine, acetophenon and diethylene glycol dimethyl ether as the electron donators instead of the organic silicon compound, and the results were shown in Table 6. Those are not preferable, because of decreased rigidity and more produced amounts of polymers soluble in the polymerization solvent compared to the invention.

TABLE 6

POLYMERIZATION RESULT AND PHYSICAL PROPERTY OF THE PRODUCTS

|  |  | Comparative Example 10 | Comparative Example 11 | Comparative Example 12 | Comparative Example 13 |
|---|---|---|---|---|---|
| Solid Catalyst Component (A) |  | This Invention | → | → | → |
| Organic Aluminum Compound (B) |  | TEA | → | → | → |
| Organic Silicon Compound (C) |  | 1* | B* | C* | D* |
| B/C Molar Ratio |  | 5 | 5 | 5 | 5 |
| Polymerization Process (I) |  |  |  |  |  |
| 1st Step MFR | g/10 min | 128 | 129 | 130 | 128 |
| 2nd Step MFR | g/10 min | 77 | 74 | 71 | 72 |
| log MFR (h)/MFR (1) |  | 0.22 | 0.24 | 0.26 | 0.25 |
| Ratio of Polymerization Amount 1st Step:2nd Step |  | 51:49 | 50:50 | 52:48 | 50:50 |
| MFR (i) | g/10 min | 100 | 98 | 97 | 96 |
| Glycol Compound (D) |  | A* | A* | A* | A* |
| D/Ti in Catalyst Molar Ratio |  | 10 | 10 | 10 | 10 |
| Polymerization Process (II) |  | 0.006 | 0.004 | 0.006 | 0.005 |
| MFR (ii) | g/10 min |  |  |  |  |
| Ratio of Polymerization Amount Polymerization(I):Polymerization(II) |  | 87:13 | 87:13 | 88:12 | 87:13 |
| Product Powder |  |  |  |  |  |
| MFR | g/10 min | 28 | 26 | 30 | 27 |
| log(MFR (i)/MFR (ii)) |  | 4.2 | 4.4 | 4.2 | 4.3 |
| R - E* | wt % | 48 | 51 | 50 | 51 |
| T - E* | wt % | 6.2 | 6.6 | 6 | 6.6 |
| Catalyst Activity* | g/g-(A) | 6800 | 8800 | 9000 | 8500 |
| Soluble Polymer | % | 5.8 | 4.9 | 4.5 | 6.6 |
| Injection Mold |  |  |  |  |  |

TABLE 6-continued

POLYMERIZATION RESULT AND PHYSICAL PROPERTY OF THE PRODUCTS

|  |  | Comparative Example 10 | Comparative Example 11 | Comparative Example 12 | Comparative Example 13 |
|---|---|---|---|---|---|
| Bending Elasticity | MPa | 1230 | 1380 | 1330 | 1240 |
| Tensile Strength | MPa | 30 | 32 | 31 | 28 |
| Tensile Elongation | % | 120 | 155 | 145 | 160 |
| HDT | °C. | 102 | 108 | 106 | 101 |
| I I* | J/m | 95 | 92 | 98 | 95 |
| F E | piece/1000 cm² | 22 | 18 | 17 | 20 |

Note.
1*: Methyl-p-Toluirate
B*: Triethylamine
C*: Acetophenone
D*: Diethyleneglycoldimethylether Examples 15 to 19, Comparative Examples 14

The procedures were carried out similarly to Example 2 except for changing the kinds and the amounts of glycol type compounds to be added in the pressure reducing tank 3.

TABLE 7

POLYMERIZATION RESULT AND PHYSICAL PROPERTY OF THE PRODUCTS

|  |  | Example 15 | Example 16 | Example 17 | Example 18 | Example 19 | Comparative Example 14 |
|---|---|---|---|---|---|---|---|
| Solid Catalyst Component (A) |  | This Invention | → | → | → | → | → |
| Organic Aluminum Compound (B) |  | TEA | → | → | → | → | → |
| Organic Silicon Compound (C) |  | DiPDMS* | → | → | → | → | → |
| B/C Molar Ratio |  | 5 | 5 | 5 | 5 | 5 | 5 |
| Polymerization Process (I) |  |  |  |  |  |  |  |
| 1st Step MFR | g/10 min | 126 | 124 | 125 | 126 | 130 | 119 |
| 2nd Step MFR | g/10 min | 73 | 73 | 71 | 75 | 74 | 73 |
| log MFR (h)/MFR (1) |  | 0.23 | 0.23 | 0.25 | 0.23 | 0.24 | 0.21 |
| Ratio of Polymerization Amount 1st Step:2nd Step |  | 52:48 | 55:45 | 53:47 | 51:49 | 53:47 | 54:46 |
| MFR (i) | g/10 min | 97 | 95 | 96 | 98 | 100 | 95 |
| Glycol Compound (D) |  | E* | F* | G* | H* | H* |  |
| D/Ti in Catalyst Molar Ratio |  | 10 | 20 | 20 | 10 | 30 | 10 |
| Polymerization Process (II) |  | 0.005 | 0.006 | 0.006 | 0.005 | 0.005 | 0.005 |
| MFR (ii) | g/10 min |  |  |  |  |  |  |
| Ratio of Polymerization Amount Polymerization(I):Polymerization(II) |  | 88:12 | 87:13 | 87:13 | 88:12 | 87:13 | 87:13 |
| Product Powder |  |  |  |  |  |  |  |
| MFR | g/10 min | 30 | 27 | 27 | 30 | 28 | 26 |
| log(MFR (i)/MFR (ii)) |  | 4.3 | 4.2 | 4.2 | 4.3 | 4.3 | 4.3 |
| R - E* | wt % | 49 | 48 | 51 | 49 | 50 | 52 |
| T - E* | wt % | 5.9 | 6.4 | 6.4 | 5.9 | 6.5 | 6.8 |
| Catalyst Activity* | g/g-(A) | 10800 | 10700 | 10500 | 10500 | 10200 | 9900 |
| Soluble Polymer | % | 2.8 | 2.7 | 2.6 | 2.6 | 2.7 | 3.2 |
| Injection Mold |  |  |  |  |  |  |  |
| Bending Elasticity | MPa | 1530 | 1520 | 1520 | 1520 | 1510 | 1520 |
| Tensile Strength | MPa | 38 | 37 | 38 | 38 | 37 | 38 |
| Tensile Elongation | % | 350 | 330 | 340 | 440 | 440 | 182 |
| HDT | °C. | 117 | 117 | 117 | 118 | 117 | 117 |
| I I* | J/m | 99 | 98 | 100 | 97 | 102 | 96 |
| F E | piece/1000 cm² | 28 | 12 | 10 | 33 | 7 | 640 |

Note.
E*: Triethyleneglycoldimethylether
F*: Triethyleneglycolmethylether
G*: Tripropyleneglycoldiacrylate
H*: Tripropyleneglycoldimethacrylate
I*: Diethyleneglycoldimethylether

What we claim is:

1. A continuous process for preparation of highly rigid propylene-ethylene block copolymers comprising the steps of:

(1) continuously feeding propylene, optionally containing up to 5% of ethylene by weight, to a catalyst in a first stage polymerization (FS) to prepare 60 to 95% of a propylene block based on the total weight of the final copolymer, provided that the melt flow rate (MFR) of the propylene block is controlled to give the relationship: $0.1 \leq \mathrm{Log\ (MFR(maximum)/MFR(minimum))} \leq 1$, wherein the catalyst comprises:

(A) a solid catalyst comprising titanium, magnesium, a halogen and a polyvalent carboxylic acid ester, (B) an organic aluminum compound, and (C) an organic silicon component of the formula $R^4_x R^5_y Si(OR^6)_z$, wherein $R^4$ and $R^6$ are hydrocarbon groups, $R^5$ is a hydrocarbon group, or a hydrocarbon group containing one or more heteroatom selected from the group consisting of oxygen, nitrogen, phosphorus, or silicon and $x+y+z=4$, $0 \leq x \leq 2$, $1 \leq y \leq 3$ and $1 \leq z \leq 3$;

(2) continuously feeding (i) a glycol compound in an amount of from 1 to 100 of the glycol compound/Ti (mole/atom) based on the titanium in the solid catalyst (A) and (ii) ethylene, containing 1–10% propylene by weight, to the first stage polymerization of step (1) to prepare 5 to 40% of an ethylene block based on the total weight of the final copolymer in a second stage polymerization (SS), wherein the glycol compound has the formula $R^1$—(O—$CH_2$—$C(R^3)H$—)$_n$—$OR^2$, wherein n is $3 \leq n \leq 100$, $R^1$ and $R^2$ are hydrogen atoms, or a monovalent organic group of 1 to 20 carbon atoms, or a monovalent organic group of 1 to 20 carbon atoms containing one or more heteroatom of oxygen, nitrogen, phosphorus, sulfur, or silicon, wherein $R^1$ and $R^2$ may be identical or different and $R^3$ is a hydrogen atom or a monovalent organic group having from 1 to 5 carbon atoms.

2. The process of claim 1, wherein the MFR of the propylene block in the first stage polymerization (FS) is controlled to give the relationship: $0.2 \leq \mathrm{Log(MFR(maximum)/MFR(minimum))} \leq 0.5$.

3. The process of claim 1, wherein the MFR of the polymer obtained in the first stage polymerization (FS) (MFR(i)), and the MFR of the polymer obtained in the second stage polymerization (SS) (MFR(ii)), is controlled to give the relationship $3 \leq \mathrm{Log\ (MFR(i)/MFR(ii))} \leq 7$.

4. The process of claim 3, wherein (MFR(i)) and (MFR(ii)) has the relationship $4 \leq \mathrm{Log\ (MFR(i)/MFR(ii))} \leq 6$.

5. The process of claim 1, wherein the molar ratio between (C) the organic silicon compound and (B) the organic aluminum compound has the relationship B/C=from 1 to 15.

6. The process of claim 1, wherein the first stage polymerization (FS) comprises a first tank and a second tank in series.

7. The process of claim 6, further comprising the step of:
continuously feeding n-hexane and hydrogen into the first tank of the first stage polymerization (FS).

8. The process of claim 7, further comprising the step of:
continuously transferring the contents of the first tank into the second tank and continuously feeding hydrogen into the gas phase therein.

9. The process of claim 8, further comprising the step of:
eliminating unreacted propylene, ethylene, if present, and hydrogen from the first stage polymerization (FS) to form a degassed reaction mixture.

10. The process of claim 9, further comprising the step of:
continuously transferring the reaction mixture obtained in the second tank to a third degassing tank before performing step (2).

11. The process of claim 1, further comprising the step of:
continuously transferring the reaction mixture obtained in step (2) to a fourth degassing tank and eliminating unreacted propylene, ethylene, and hydrogen from the reaction mixture obtained in step (2).

* * * * *